United States Patent [19]
Goeldner

[15] 3,666,109
[45] May 30, 1972

[54] REVERSE OSMOSIS LIQUID SEPARATION APPARATUS
[72] Inventor: Richard W. Goeldner, New Berlin, Wis.
[73] Assignee: Aqua-Chem, Inc.
[22] Filed: Apr. 23, 1970
[21] Appl. No.: 31,195

[52] U.S. Cl. ...........................210/321, 210/433, 210/490
[51] Int. Cl. .....................................B01d 31/00, B01d 13/00
[58] Field of Search.................210/22, 23, 321, 433, 541, 210/490, 491

[56] References Cited

UNITED STATES PATENTS

| | | | |
|---|---|---|---|
| 3,560,377 | 2/1971 | Loeffler | 210/541 X |
| 3,542,204 | 11/1970 | Clark | 210/321 |

Primary Examiner—Frank A. Spear, Jr.
Attorney—Fred Wiviott and Ralph G. Hohenfeldt

[57] ABSTRACT

A membrane module for use in solvent separation by reverse osmosis. Tubular membranes are mounted in liquid impervious thin-walled tubes, all within a pressure vessel, with a conduit provided for directing a liquid mixture under reverse osmosis operating pressure to the interior of the tubular membranes together with a conduit for receiving the solvent from the interface of the membranes and the liquid impervious tubes. There is also provided a conduit communicating with the high pressure liquid mixture flow path to provide liquid under the high pressure to the exterior of the liquid impervious tubes to thereby provide a support for the tubes and thus, the membrane therewithin, during reverse osmosis operating conditions.

6 Claims, 3 Drawing Figures

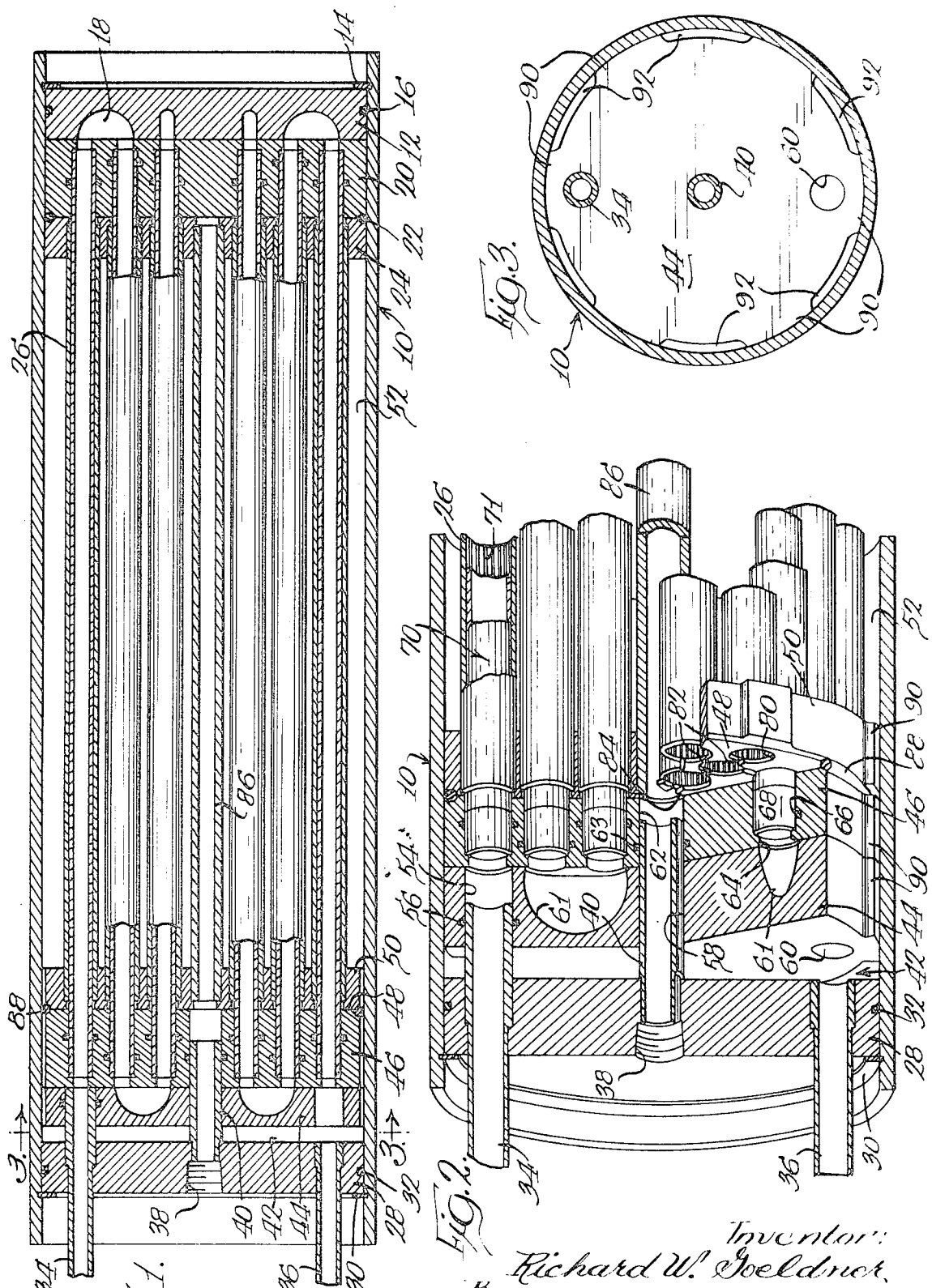

REVERSE OSMOSIS LIQUID SEPARATION APPARATUS

BACKGROUND OF THE INVENTION

Increasing demand for relatively pure water for human or industrial consumption as well as concern over pollution due to the discharge of liquid industrial waste has in recent years resulted in increased exploration to find methods and means for purifying water and various industrial solvents. Many of the methods and means used for solvent separation are extremely costly both in terms of capital investment for equipment and power cost for operating equipment as well as maintenance costs and as a result, substantial investigation has focused on one potentially inexpensive method of solvent separation, namely, reverse osmosis.

In solvent separation by reverse osmosis, a liquid mixture, such as a solution, a slurry or a colloidal suspension, etc., is placed in contact with a semipermeable membrane while being subjected to a pressure in excess of the osmotic pressure of the liquid mixture. As a result, relatively pure solvent will pass through the membrane to be collected or disposed of as desired while the liquid mixture itself will be concentrated due to the removal of a portion of the solvent therefrom.

The pressures employed naturally depend, in a large part, upon the liquid mixture being processed and in many applications, are substantial. For example, the osmotic pressure of seawater is about 350 pounds per square inch and quite typically, seawater will be subjected to reverse osmosis at pressures of about 1,000 pounds per square inch. As a result, the membrane must be supported in such a way that it will not rupture under such high operating pressures.

Heretofore, many different types of supports have been proposed for membranes. For example, one proposal employs a tubular membrane within a perforated metal support tube, generally formed of stainless steel to resist corrosion. Another proposal utilizes membranes in sheet form backed by a solid block of porous material such as a sintered ceramic, and which is of a thickness sufficient to withstand the pressures involved in reverse osmosis. A third proposal utilizes tubular membranes within a tube formed by intricately winding fiberglass strands about a mandrel and impregnating the same with resin in such a way that the tube is porous and yet is capable of withstanding reverse osmosis operating pressures. Still another proposal employs a support tube for a tubular membrane structure formed of a relatively cheap metal and lined with a longitudinally grooved plastic insert with both the support tube and the insert being imperforate with solvent collection being facilitated by the grooves in the plastic insert which may be formed simply by conventional extrusion processes.

Of the foregoing proposals, the first two are relatively impractical and have not been employed to any significant degree. Specifically, the cost of stainless steel and the expense of perforating the same suggests that a perforated stainless steel tube as a support means is economically unfeasible. In the case of a porous block as a membrane support, the excessive bulk of the block is a significant drawback.

The third proposal has seen some use but the cost of forming the delicate tubes which, in practice, are used with the membrane cast and bonded to the interior surface thereof, has tended to limit their use. And all of the first three proposals have a common drawback. Specifically, since the solvent is exuded through pores or perforations into the open to be collected, the same can be relatively easily contaminated.

The fourth proposal to date offers the most promise in that it may be used in conjunction with a disposable membrane structure received within the plastic liner so that when a membrane has served its usefulness, it may be removed and replaced. This feature has a significant advantage over fiberglass wound porous tubes which, in practice, are disposed of when the membrane fails. The structure has the further advantage of permitting the solvent to be collected in a closed space at the interface between the membrane structure and the plastic liner to avoid contamination. However, even with the use of an imperforate tube which may be formed of a cheap metal and lined with plastic, the cost of the metal tube and the lining process contributes substantially to the cost of the equipment.

SUMMARY OF THE INVENTION

It is the principal object of the invention to provide a new and improved reverse osmosis separation apparatus that may be constructed more economically than those heretofore known.

More specifically, it is an object of the invention to provide a support for a membrane in reverse osmosis equipment that need not be capable, in and of itself, of withstanding the high pressures encountered in reverse osmosis operations thereby permitting the support to be formed of inexpensive, low strength materials in a way that does not require as great a quantity of the material as has been necessary in those apparatus heretofore known.

The exemplary embodiment of the invention achieves the foregoing objects in a membrane module employing tubular membranes of the disposable type mentioned previously in conjunction with liquid impervious, thin-walled, support tubes which may be formed of plastic or the like. More specifically, the support tubes may be fabricated in such a way as to be incapable of withstanding prolonged exposure to reverse osmosis operating pressures and only capable of withstanding pressures on the order of 10–60 pounds per square inch. In order to utilize the support tubes as a supporting means, the support tubes are enclosed within a pressure vessel to substantially fill the same. The pressure vessel includes an inlet for the liquid mixture to be treated and an outlet for the treated liquid mixture. It additionally includes a solvent outlet. Conduit means within the vessel are associated with the inlet and the outlet as well as the tubular membranes in such a way as to establish a flow path from the inlet to the outlet for the liquid mixture to be treated under high pressure. Means associated with the flow path are provided for transmitting the pressure of the liquid mixture therein to the exterior of the liquid impervious support tubes to thereby substantially equalize the pressure applied by the liquid mixture to the interior of the membrane and the pressure to the exterior of the membrane applied by mechanical contact of the support tube thereagainst. In the exemplary embodiment, such means comprise a conduit in fluid communication with the flow path near the liquid mixture outlet and the space within the vessel in which the tubes are received. Thus, the liquid mixture to be processed under high pressure is introduced into the voids between the exteriors of the tubes within the vessel.

As a result, a pressure differential of generally no more than 10–60 pounds per square inch, due to pressure losses in the flow path, will exist from the interior of the membrane to the exterior of the support tube adjacent the inlet, thereby enabling the use of inexpensive support tubes.

Other objects and advantages of the invention will become apparent from the following specification taken in conjunction with the accompanying drawings.

DESCRIPTION OF THE DRAWINGS

FIG. 1 is a sectional view of a membrane module embodying the invention;

FIG. 2 is a partial perspective of the membrane module with parts broken away for clarity; and FIG. 3 is a cross sectional view taken approximately along the line 3—3 of FIG. 1.

DESCRIPTION OF THE PREFERRED EMBODIMENT

An exemplary embodiment of the invention employed in a membrane module is illustrated in FIG. 1, and is seen to include a pressure vessel, generally designated 10, which may be in the form of a relatively large tube fabricated of fiberglass reinforced resin. Adjacent one end of the pressure vessel 10 is an end cap 12 held in place by a retaining ring 14 and sealed by an O-ring 16. The end cap 12 includes fluid directing channels 18 for conveying the liquid mixture to be processed between a plurality of membrane cells as will be seen.

Inwardly of the end cap 12 is a seal mount 20 for sealing the individual membrane cells so that liquid mixture to be processed cannot mingle with solvent passing through the membranes. Inwardly, in turn, of the seal mount 20 is a baffle 22 which directs the purified solvent to a collection conduit in a manner to be described in greater detail hereinafter. Finally, inwardly of the baffle 22 is a header 24 which mounts the ends of a plurality of membrane support tubes 26.

At the leftmost end of the vessel 10, as seen in FIG. 1, there is provided an inlet and outlet mount 28 which is held in place by a retaining ring 30 similar to retaining ring 14. The mount 28 also includes an O-ring 32 to retain fluid under pressure within the vessel 10 and which is similar to the O-ring 16.

Supported by the mount 28 is an inlet conduit 34 into which is directed the liquid mixture to be processed at pressures in excess of the osmotic pressure of the liquid mixture. For example, in the case of seawater, which has osmotic pressure of about 350 pounds per square inch, seawater would be introduced into the membrane module through the conduit 34 at pressures that may range as high as 1,000 pounds per square inch or more. The mount 28 also includes an outlet conduit 36 from which the concentrated liquid mixture may be discharged. Finally, the mount 28 may include a bore terminating in a threaded end 38 for connection to any suitable system for utilizing or disposing of the recovered solvent of the liquid mixture. The end of the bore opposite the threaded end 38 mounts a conduit 40 which extends into the vessel for receiving the solvent from a solvent flow path therein as will be seen.

Spaced inwardly of the mounting element 28 so as to define a high pressure area 42, is an end cap 44 generally similar to the end cap 12 except that, as will be seen, provision is made for a liquid mixture inlet and outlet and a solvent outlet.

Inwardly in turn of the end cap 44 is a seal mount 46, a baffle 48 and a header 50, all generally similar to the seal mount 20, the baffle 22 and the header 24, respectively.

Intermediate the headers 24 and 50 is a fluid receiving space 52 which is substantially filled by the support tubes 26 but includes voids between the tubes 26 which receive the liquid mixture under pressure for the purpose of pressurizing the exterior of the support tubes 26 as will be seen.

Referring now to FIG. 2, it will be seen that the end cap 44 includes a first bore 54 having an internal groove 56 which may receive an O-ring or the like and which slidably receives an inwardly projecting portion of the inlet conduit 34. The end cap 44 also includes a second bore 58 which receives the conduit 40 and a third bore 60 which is aligned with the outlet circuit 36. In addition, various channels 61 are present and serve the same purpose as the channels 18 shown in FIG. 1.

The seal mount 46 includes a central bore 62 having an O-ring receiving groove 63 for receiving the conduit 40 and further includes a plurality of bores 64. Each bore 64 has an internal groove 66 which receives an O-ring with the bores 64 being adapted to receive liquid impervious ends 68 of respective membrane units 70. Channels 61 are arranged with respect to the bores 64 in any suitable manner so as to provide a desired flow path between tubular membrane cells, each of which is defined by one of the support tubes 26 and a membrane unit 70. The membrane units 70 may be of the form described in a copending, commonly assigned application of Clark, Ser. No. 788,871, filed Jan. 3, 1969, and entitled "Reverse Osmosis Liquid Purification", now Pat. No. 3,581,900, dated June 1, 1971, and co-operate with the support tubes 26 in the same manner such that pure solvent is directed to the interface of each membrane structure 70 and its associated support tube 26, and by grooves 71 in the interior surface of the support tube 26, or the exterior of the structure 70 (not shown) or both, flows to the ends thereof adjacent the baffles 22 and 48. However, the nature of the support tubes 26 herein in terms of physical strength and construction differs substantially from that disclosed in the aforementioned Clark application.

Specifically, support tubes 26 may be formed as thin-walled tubes of any inexpensive, corrosion resistant material, such as plastic and generally need be capable only of supporting a pressure differential from the interior to the exterior of about 10–60 pounds per square inch.

In any event, the liquid impervious ends 68 of the membrane structure are adapted to extend beyond the ends of the respective support tubes 26 into the seal mount 46 to be engaged by the O-ring seal 66 which provides a satisfactory high pressure seal. Solvent permeating the membrane associated with each membrane structure flows longitudinally along the interface of the membrane structure 70 and associated support tube 26 until it reaches either the baffle 22 or the baffle 48. Both of the baffles are constructed in identical fashion and accordingly, only one need be described herein.

Referring specifically to the baffle 48, there is provided a plurality of apertures 80 therein which are aligned with the support tubes 26 and which may be of slightly larger diameter than the inside diameter of the support tubes so that the liquid flowing along the support tubes can be received about the periphery of each aperture 80 (the center of each aperture is occupied by membrane structure 70). Alternatively, one edge of each aperture 80 may have a slight chamfer.

Interconnecting the apertures 80 are small grooves 82 formed in the baffle and which provide for fluid communication between the apertures 80 and a central aperture 84 which is aligned with the pure solvent outlet conduit 40.

To provide for the conduction of solvent from the baffle 22, to the solvent outlet conduit 40, in addition to the support tubes 26, there is provided a pure solvent return tube located in alignment with the conduit 40. As a result, pure solvent fed to the central aperture 84 in the baffle 22 may pass through the tube 86 to the outlet conduit 40. It should be noted that the return tube 86, unlike the support tubes 26, must be formed of sufficient strength to withstand the reverse osmosis operating pressures as the same is exteriorly exposed to such pressures while the solvent within the same will be at a relatively low pressure, normally but a few pounds per square inch. To seal the baffle 48 from the remainder of the structure, the same has an outside diameter that is somewhat less than the inside diameter of the vessel 10 and an O-ring 88 is adapted to surround the same at the interface of the seal mount 46 and the header 50.

As best seen in FIGS. 2 and 3, the end cap 44, the seal mount 46 and the header 50 are circumferentially provided with outwardly extending spacer lugs 90 so that a plurality of channels between adjacent lugs 90 are defined. As best seen in FIG. 2, the channels 92 establish fluid communication between the high pressure area 42 and the fluid receiving space 52. As a result, the liquid mixture under high pressure as it is about to exit the apparatus can flow into the fluid receiving space 52 until the same is filled. Therefore, there is established a means by which the pressure of the liquid mixture in the liquid mixture flow path is transmitted to the exterior of the support tubes 26. As a result, there will be substantial equalization of pressure between the exterior of the support tube 26 and the interior of the membrane, the difference normally being but 10–60 pounds per square inch inasmuch as fluid communication between the fluid receiving space 52 and the liquid mixture flow path is established in the exemplary embodiment to a point near the outlet and there will be some pressure drop in the liquid mixture as it moves through the apparatus.

As a result, the support tubes 26 need only be made of sufficient strength to withstand the minimal pressure differential that will exist and for most practical purposes, a strength sufficient to withstand a pressure differential of 10–60 pounds per square inch would be sufficient. This minimum strength requirement permits the use of relatively inexpensive materials for forming the support tubes 26 and minimizes the quantity of material required in that the support tubes 26 may be formed with relatively thin walls thereby obviating much of the expense heretofore required for provision of support tubes in membrane structures employed in reverse osmosis apparatus.

I claim:

1. A membrane module for use in solvent separation by reverse osmosis comprising:
   means defining a pressure vessel capable of withstanding prolonged exposure to reverse osmosis operating pressures;
   a plurality of membrane cells within said pressure vessel, each cell including a semipermeable membrane and a liquid impervious solvent directing means having a first side associated therewith for receiving solvent permeating the membrane and for directing the same to a solvent outlet, and a second side, said solvent directing means being incapable of withstanding high pressures for a prolonged period;
   means defining a supporting fluid receiving space within said vessel and outside each membrane cell and adjacent the second side of each said solvent directing means;
   liquid mixture directing means for directing a liquid mixture to be processed under reverse osmosis operating pressure to the inside of each membrane cell; and
   means associated with said liquid mixture directing means whereby reverse osmosis operating pressure from said liquid mixture is transmitted to supporting fluid in said supporting fluid receiving space to thereby substantially equalize the internal and external pressure applied to each cell whereby the supporting fluid supports each said solvent directing means which thereby serves as a support for its associated membrane during reverse osmosis operating conditions.

2. A membrane module according to claim 1 wherein said last-named means includes means for channeling the liquid mixture to be processed to said fluid receiving space.

3. Reverse osmosis solvent separation apparatus comprising:
   a semipermeable membrane having one side adapted to be subjected to a pressurized liquid mixture and a second side from which solvent permeating the membrane may be collected,
   liquid impervious solvent directing means having an exterior surface and an interior surface the latter of which is adjacent said membrane second side and surrounding said membrane for receiving solvent permeating said membrane and for directing the solvent to a collection point, said liquid impervious solvent directing means being incapable of withstanding prolonged exposure to substantial pressure, and
   means for applying a liquid mixture under pressure in excess of the osmotic pressure of the liquid mixture to said membrane one side and to the exterior surface of said solvent directing means oppositely of said membrane,
   whereby pressure on said solvent directing means is substantially equal to pressure on said membrane so that said solvent directing means supports said membrane against rupture under reverse osmosis operating conditions.

4. Reverse osmosis solvent separation apparatus comprising:
   a semipermeable tubular membrane having one side adapted to be subjected to a pressurized liquid mixture and a second side from which solvent permeating the membrane may be collected,
   liquid impervious solvent directing means comprising a thin walled tube surrounding said membrane and adjacent said membrane second side for receiving solvent permeating said membrane and for directing the solvent to a collection point, said liquid impervious solvent directing means being incapable of withstanding prolonged exposure to substantial pressure, and
   means for applying a liquid mixture under pressure in excess of the osmotic pressure of the liquid mixture to said membrane one side and to said solvent directing means oppositely of said membrane,
   whereby pressure on said solvent directing means is substantially equal to pressure on said membrane so that said solvent directing means supports said membrane against rupture under reverse osmosis operating conditions.

5. Reverse osmosis solvent separation apparatus comprising:
   a. an elongated pressure vessel,
   b. a plurality of elongated, thin-walled liquid impervious tubes within and substantially filling said vessel,
   c. a plurality of tubular semipermeable membranes, each within an associated one of said thin-walled tubes,
   d. a solvent outlet in said vessel,
   e. means establishing fluid communication between said solvent outlet and the interface of each of said tubes and their associated membranes,
   f. a liquid mixture inlet in said vessel,
   g. a liquid mixture outlet in said vessel,
   h. means, including said tubular membranes, establishing a flow path for the liquid mixture between said liquid mixture inlet and said liquid mixture outlet, and
   i. means associated with one of said liquid mixture inlet, liquid mixture outlet and flow path for transmitting the pressure of a liquid mixture being processed to the exterior of said tubes.

6. Reverse osmosis apparatus according to claim 5 wherein said last-named means comprises a fluid passage within said vessel extending from one of said liquid mixture inlet, liquid mixture outlet and said flow path to a space within said vessel in which said tubes are disposed.

* * * * *